United States Patent
Snell et al.

(10) Patent No.: US 10,226,761 B2
(45) Date of Patent: Mar. 12, 2019

(54) AROMATIZATION CATALYST PREPARATION WITH ALKALI METAL PRESENT DURING A WASHING STEP

(71) Applicant: Chevron Phillips Chemical Company LP, The Woodlands, TX (US)

(72) Inventors: Ryan W. Snell, Kingwood, TX (US); Xianghong Hao, Kingwood, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 15/384,366

(22) Filed: Dec. 20, 2016

(65) Prior Publication Data

US 2018/0169638 A1     Jun. 21, 2018

(51) Int. Cl.

| | | |
|---|---|---|
| *B01J 29/74* | (2006.01) | |
| *B01J 35/10* | (2006.01) | |
| *B01J 37/02* | (2006.01) | |
| *B01J 37/06* | (2006.01) | |
| *B01J 37/08* | (2006.01) | |
| *B01J 37/22* | (2006.01) | |
| *B01J 37/24* | (2006.01) | |
| *B01J 37/26* | (2006.01) | |
| *B01J 37/30* | (2006.01) | |
| *B01J 23/42* | (2006.01) | |

(Continued)

(52) U.S. Cl.
CPC ............... *B01J 29/74* (2013.01); *B01J 23/42* (2013.01); *B01J 23/58* (2013.01); *B01J 29/62* (2013.01); *B01J 35/1019* (2013.01); *B01J 35/1038* (2013.01); *B01J 37/0018* (2013.01); *B01J 37/0201* (2013.01); *B01J 37/0207* (2013.01); *B01J 37/06* (2013.01); *B01J 37/08* (2013.01); *B01J 37/22* (2013.01); *B01J 37/24* (2013.01); *B01J 37/26* (2013.01); *B01J 37/30* (2013.01); *C10G 35/095* (2013.01); *C10G 45/70* (2013.01); *B01J 2229/42* (2013.01); *B01J 2229/64* (2013.01); *C10G 2400/30* (2013.01)

(58) Field of Classification Search
None
See application file for complete search history.

(56) References Cited

U.S. PATENT DOCUMENTS

| | | |
|---|---|---|
| 4,456,527 A | 6/1984 | Buss et al. |
| 4,678,764 A | 7/1987 | Le et al. |

(Continued)

FOREIGN PATENT DOCUMENTS

| | | |
|---|---|---|
| EP | 0 201 856 A1 | 11/1986 |
| EP | 0 535 619 A1 | 4/1993 |

(Continued)

OTHER PUBLICATIONS

Bécue et al., entitled "*Influence of Cesium in Pt/NaCsβ on the Physico-Chemical and Catalytic Properties of the Pt Clusters in the Aromatization of n-Hexane*," Journal of Catalysis, 1999, vol. 181, pp. 244-255.

(Continued)

*Primary Examiner* — Colin W. Slifka
(74) *Attorney, Agent, or Firm* — Merchant & Gould P.C.

(57) ABSTRACT

Methods for producing supported catalysts containing a transition metal and a bound zeolite base are disclosed. These methods employ a step of washing the bound zeolite base in the presence of an alkali metal, prior to impregnating the bound zeolitic support with the transition metal. Alkali metals such as potassium and cesium may be used.

21 Claims, 4 Drawing Sheets

(51) Int. Cl.

| | |
|---|---|
| *B01J 23/58* | (2006.01) |
| *B01J 29/62* | (2006.01) |
| *B01J 37/00* | (2006.01) |
| *C10G 35/095* | (2006.01) |
| *C10G 45/70* | (2006.01) |

(56) References Cited

U.S. PATENT DOCUMENTS

| | | | |
|---|---|---|---|
| 4,987,109 | A | 1/1991 | Kao et al. |
| 5,155,074 | A | 10/1992 | Mohr |
| 5,196,631 | A | 3/1993 | Murakawa et al. |
| 5,389,235 | A | 2/1995 | Russ et al. |
| 5,401,365 | A | 3/1995 | Chen et al. |
| 5,401,386 | A | 3/1995 | Morrison et al. |
| 6,190,539 | B1 | 2/2001 | Holtermann et al. |
| 6,207,042 | B1 | 3/2001 | Holtermann et al. |
| 6,406,614 | B1 | 6/2002 | Tiedtke et al. |
| 6,518,470 | B1 | 2/2003 | Fukunaga et al. |
| 6,812,180 | B2 | 11/2004 | Fukunaga |
| 7,153,801 | B2 | 12/2006 | Wu |
| 7,932,425 | B2 | 4/2011 | Blessing et al. |
| 8,835,341 | B2 | 9/2014 | Khare |
| 2009/0156871 | A1 | 6/2009 | Khare |
| 2010/0160147 | A1 | 6/2010 | Wu |
| 2018/0065115 | A1 | 3/2018 | Alvez-Manoli |
| 2018/0169640 | A1 | 6/2018 | Snell |

FOREIGN PATENT DOCUMENTS

| | | |
|---|---|---|
| EP | 2 170 509 A1 | 4/2010 |
| WO | WO 86/02861 A1 | 5/1986 |

OTHER PUBLICATIONS

Besoukhanoya et al., entitled "*Platinum-Zeolite Interactions in Alkaline L Zeolites*," J. Chem. Soc., Faraday Trans., 1981, vol. 77, pp. 1595-1604.

Dyer et al., entitled "*Cation-exchange in synthetic zeolite L: The exchange of hydronium and ammonium ions by alkali metal and alkaline earth cations*," Zeolites, 1993, vol. 13, Apr./May, pp. 281-290.

Maldonado et al., entitled "*Influence of the Alkali in Pt/Alkali-β Zeolite on the Pt Characteristics and Catalytic Activity in the Transformation on n-Hexane*," Journal of Catalysis, 2000, vol. 195, pp. 342-351.

Mojet et al., entitled "*A New Model Describing the Metal-Support Interaction in Nobel Metal Catalysts*," Journal of Catalysis, 1999, vol. 186, pp. 373-386.

Newell et al., entitled "*Ion-exchange and cation site locations in zeolite L*," Zeolites, 1983, vol. 3, Jan., pp. 22-27.

Ramaker et al., entitled "*Nature of the Metal-Support Interaction in Supported Pt Catalysts: Shift in Pt Valence Orbital Energy and Charge Rearrangement*," Journal of Catalysis, 2001, vol. 203, pp. 7-17.

Sugimoto et al., entitled "*Improvement of platinum-supported zeolite catalysts for n-hexane aromatization by halocarbon treatment and alkaline soaking*," Applied Catalysis A: General, 1993, vol. 96, pp. 201-216.

Sugimoto et al., entitled "*Electronic state of platinum supported on the monochlorotrifluoromethane-treated alkaline L zeolite*," Applied Catalysis A: General, 1993, vol. 102, pp. 167-180.

Zheng et al., entitled "*Comparison between β and L zeolites supported platinum for n-hexane aromatization*," Applied Catalysis A: General, 1995, vol. 126, pp. 141-152.

International Search Report and the Written Opinion of the International Searching Authority in PCT/US2017/066262 dated Apr. 16, 2018, 25 pages.

AROMATIZATION CATALYST PREPARATION WITH ALKALI METAL PRESENT DURING A WASHING STEP

FIELD OF THE INVENTION

The present disclosure concerns methods for producing supported catalysts, and more particularly relates to the production of supported aromatization catalysts containing a transition metal and a bound zeolite base using a washing step in which an alkali metal is present.

BACKGROUND OF THE INVENTION

The standard manufacturing process for many supported aromatization catalysts typically involves forming a bound zeolite base from a binder and a zeolite, and the zeolite may be ion-exchanged prior to formation of the bound zeolite base. The bound zeolite generally is washed prior to the addition of a transition metal, such as platinum, and a halogen, thereby forming the supported aromatization catalyst.

It may not be desirable to perform an ion-exchange process after the formation of the bound zeolite base, due in part to the additional cost and complexity that it would add to the overall manufacturing process of the catalyst. However, it may be beneficial to enrich the bound zeolite support with an alkali metal to improve the properties of the resultant supported aromatization catalyst without the necessity of an ion-exchange process. Accordingly, it is to these ends that the present disclosure is generally directed.

SUMMARY OF THE INVENTION

Methods for producing supported catalysts are disclosed and described herein. One such method for producing a supported catalyst may comprise (a) providing a bound zeolite base, (b) washing the bound zeolite base with an aqueous solution comprising an alkali metal to produce an alkali metal enriched zeolite support, and (c) impregnating the alkali metal enriched zeolite support with a transition metal and a halogen to produce the supported catalyst. Typically, the alkali metal may comprise potassium, rubidium, cesium, or combinations thereof, and the transition metal may comprise platinum.

Supported catalysts produced by the methods provided herein may be used in aromatization processes to produce aromatic compounds from non-aromatic hydrocarbons. Such catalysts may have the unexpected combination of increased product selectivity (e.g., to benzene or toluene), but with lower catalyst surface area and lower catalyst micropore volume, as compared to supported catalysts prepared without a washing step that utilizes an alkali metal.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
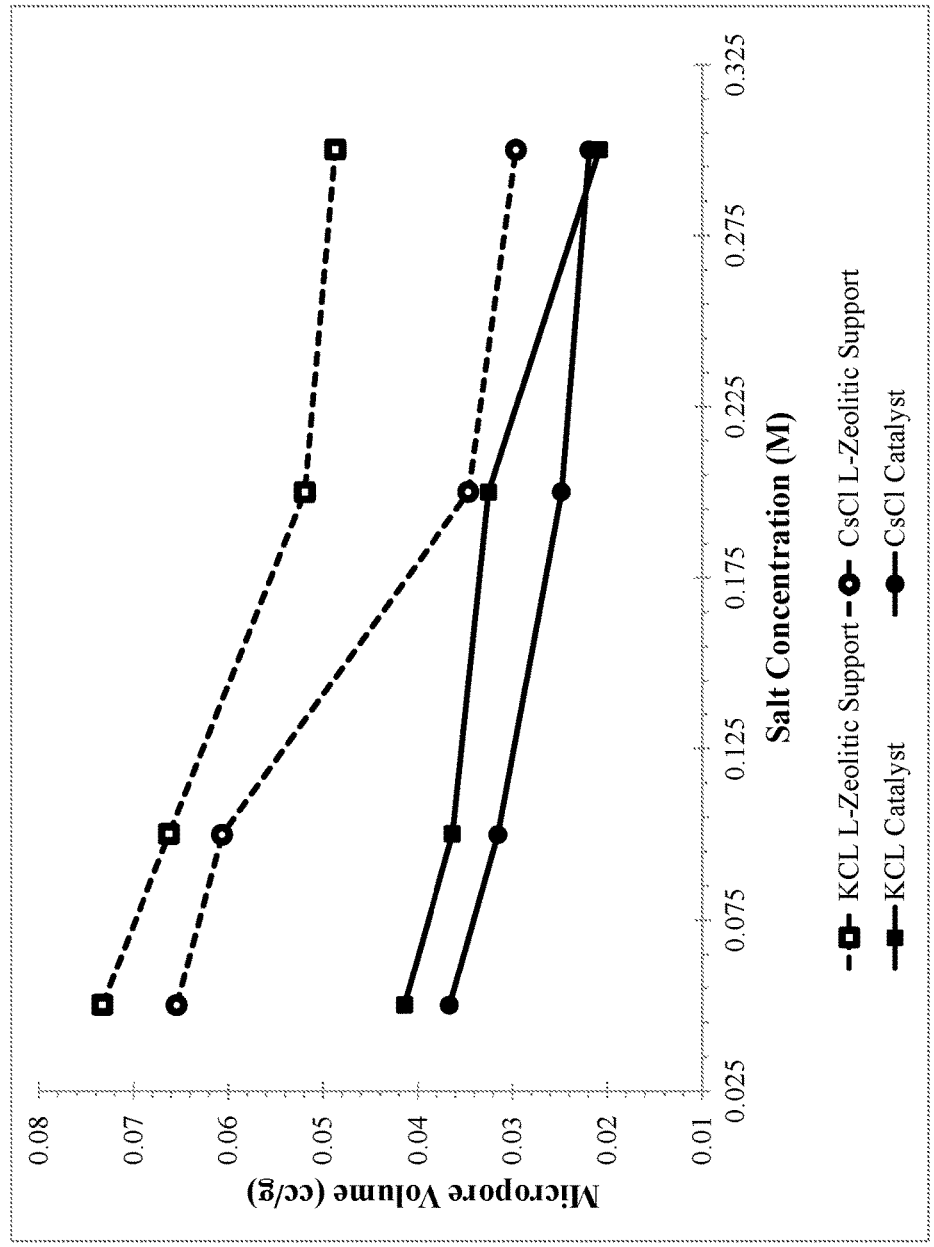
FIG. 1 presents a plot of the micropore volume of the alkali metal enriched zeolite support and the micropore volume of the supported catalyst versus the molar concentration of the alkali metal in the aqueous solution used to wash the bound zeolite base, for cesium and potassium alkali metals.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), may be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features may be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein may be combined to describe inventive designs, compositions, processes, or methods consistent with the present disclosure.

In this disclosure, while compositions and methods are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "a halogen," is meant to encompass one, or mixtures or combinations of more than one, transition metal or halogen, unless otherwise specified.

Generally, groups of elements are indicated using the numbering scheme indicated in the version of the periodic table of elements published in *Chemical and Engineering News*, 63(5), 27, 1985. In some instances, a group of elements may be indicated using a common name assigned to the group; for example, alkali metals for Group 1 elements, transition metals for Group 3-12 elements, and halogens or halides for Group 17 elements.

For any particular compound or group disclosed herein, any name or structure (general or specific) presented is intended to encompass all conformational isomers, regioisomers, stereoisomers, and mixtures thereof that may arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For example, a general reference to hexane includes n-hexane, 2-methyl-pentane, 3-methyl-pentane, 2,2-dimethyl-butane, and 2,3-dimethyl-butane; and a general reference to a butyl group includes a n-butyl group, a sec-butyl group, an iso-butyl group, and a t-butyl group.

In one aspect, a chemical "group" may be defined or described according to how that group is formally derived from a reference or "parent" compound, for example, by the number of hydrogen atoms removed from the parent compound to generate the group, even if that group is not literally synthesized in such a manner. These groups may be utilized as substituents or coordinated or bonded to metal atoms. By way of example, an "alkyl group" formally may be derived by removing one hydrogen atom from an alkane. The disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that the methods provided herein may employ a molar concentration of the alkali metal in the aqueous solution in a range from about 0.01 M to about 0.45 M in certain aspects. By a disclosure that the molar concentration of the alkali metal in the aqueous solution may be in a range from about 0.01 M to about 0.45 M, the intent is to recite that the concentration may be any concentration within the range and, for example, may be equal to about 0.01 M, about 0.05 M, about 0.1 M, about 0.15 M, about 0.2 M, about 0.25 M, about 0.3 M, about 0.35 M, about 0.4 M, or about 0.45 M. Additionally, the molar concentration may be within any range from about 0.01 M to about 0.45 M (for example, the molar concentration may be in a range from about 0.01 M to about 0.2 M), and this also includes any combination of ranges between about 0.01 M and about 0.45 M. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, preferably within 5% of the reported numerical value.

As used herein, the term "hydrocarbon" refers to a compound containing only carbon and hydrogen atoms. Other identifiers may be utilized to indicate the presence of particular groups, if any, in the hydrocarbon (e.g., halogenated hydrocarbon indicates the presence of one or more halogen atoms replacing an equivalent number of hydrogen atoms in the hydrocarbon).

An "aromatic" compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds, e.g., benzene, toluene, and xylenes) and "heteroarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)). As disclosed herein, the term "substituted" may be used to describe an aromatic group, arene, or heteroarene, wherein a non-hydrogen moiety formally replaces a hydrogen atom in the compound, and is intended to be non-limiting, unless specified otherwise.

As used herein, the term "alkane" refers to a saturated hydrocarbon compound. Other identifiers may be utilized to indicate the presence of particular groups, if any, in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. The alkane or alkyl group may be linear or branched unless otherwise specified.

A "cycloalkane" is a saturated cyclic hydrocarbon, with or without side chains, for example, cyclobutane, cyclopentane, cyclohexane, methyl cyclopentane, and methyl cyclohexane. Other identifiers may be utilized to indicate the presence of particular groups, if any, in the cycloalkane (e.g., halogenated cycloalkane indicates the presence of one or more halogen atoms replacing an equivalent number of hydrogen atoms in the cycloalkane).

The term "halogen" has its usual meaning. Examples of halogens include fluorine, chlorine, bromine, and iodine.

Molar selectivities are defined as:

$$\text{Benzene selectivity: } S_{Bz} = \frac{\dot{n}_{Bz,prod}}{\dot{n}_{conv\ C6,feed} - \dot{n}_{conv\ C6,prod}} \quad \text{Eq. 1}$$

$$\text{Toluene selectivity: } S_{Tol} = \frac{\dot{n}_{Tol,prod}}{\dot{n}_{conv\ C7,feed} - \dot{n}_{conv\ C7,prod}} \quad \text{Eq. 2}$$

$$\text{Benzene + Toluene selectivity: } S_{Bz+Tol} = \quad \text{Eq. 3}$$
$$\frac{\dot{n}_{Bz,prod} + \dot{n}_{Tol,prod}}{\dot{n}_{conv\ C6,C7,feed} - \dot{n}_{conv\ C6,C7,prod}}$$

$$\text{Aromatics selectivity: } S_{arom} = \frac{\dot{n}_{Bz,prod} + \dot{n}_{Tol,prod} + \dot{n}_{C8+arom,prod}}{\dot{n}_{conv\ C6-C8+,feed} - \dot{n}_{conv\ C6-C8+,prod}} \quad \text{Eq. 4}$$

Conversion is defined as the number of moles
converted per mol of "convertible" components fed:

$$\text{C6 conversion: } X_{C6} = \frac{\dot{n}_{conv\ C6,feed} - \dot{n}_{conv\ C6,prod}}{\dot{n}_{conv\ C6,feed}} \quad \text{Eq. 5}$$

$$\text{C7 conversion: } X_{C7} = \frac{\dot{n}_{conv\ C7,feed} - \dot{n}_{conv\ C7,prod}}{\dot{n}_{conv\ C7,feed}} \quad \text{Eq. 6}$$

$$\text{C6 + C7 conversion: } X_{C6+C7} = \quad \text{Eq. 7}$$

$$\frac{\dot{n}_{conv\ C6,feed} + \dot{n}_{conv\ C7,feed} - \dot{n}_{conv\ C6,prod} - \dot{n}_{conv\ C7,prod}}{\dot{n}_{conv\ C6,feed} + \dot{n}_{conv\ C7,feed}}$$

In these equations, n indicates a molar flow rate in a continuous reactor or the number of moles in a batch reactor.

Although any methods and materials similar or equivalent to those described herein may be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are supported catalysts having an enriched alkali metal content, methods for producing such catalysts, and the use of these catalysts in aromatization or reforming processes.

Methods for Producing Supported Catalysts

Various methods for producing supported catalysts, such as supported aromatization catalysts, are disclosed and described. One such method for producing a supported catalyst may comprise (or consist essentially of, or consist of):

(a) providing a bound zeolite base;
(b) washing the bound zeolite base with an aqueous solution comprising an alkali metal to produce an alkali metal enriched zeolite support; and
(c) impregnating the alkali metal enriched zeolite support with a transition metal and a halogen to produce the supported catalyst.

Generally, the features of any of the methods disclosed herein (e.g., the zeolite and binder components of the bound zeolite base, the transition metal, the halogen, the aqueous solution, the alkali metal, the conditions under which the washing step is conducted, and the conditions under which the impregnation step is conducted, among others) are independently described herein, and these features may be combined in any combination to further describe the disclosed methods. Moreover, other process steps may be conducted before, during, and/or after any of the steps listed in the disclosed methods, unless stated otherwise. Additionally, supported catalysts (such as supported aromatization catalysts) produced in accordance with any of the disclosed methods/processes are within the scope of this disclosure and are encompassed herein.

The step in these methods that utilizes an aqueous solution containing an alkali metal often may be referred to as a washing step, while the step in these methods that utilizes a transition metal and a halogen often may be referred to as an impregnation step. In the washing step, any compositional attributes of the aqueous solution and the alkali metal are meant to refer to the incoming aqueous solution and alkali metal, prior to contacting the bound zeolite base, unless stated otherwise. As one of skill in the art would readily recognize, the composition of the aqueous solution after contacting the bound zeolite base may vary significantly from the composition of the incoming aqueous solution containing the alkali metal.

Referring now to the bound zeolite base in step (a), any suitable bound zeolite base may be used in the methods of this invention. Typically, the bound zeolite base may comprise an inorganic oxide, examples of which may include, but are not limited to, bound medium and/or large pore zeolites (aluminosilicates), amorphous inorganic oxides, as well as mixtures thereof. Large pore zeolites often may have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often may have average pore diameters in a range of from about 5 Å to about 7 Å. Amorphous inorganic oxides may include, but are not limited to, aluminum oxide, silicon oxide, titania, and combinations thereof.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms may be equal to 2. The framework exhibits a negative electrovalence that typically may be balanced by the inclusion of cations within the crystal, such as metals, alkali metals, and/or hydrogen.

In some aspects, the bound zeolite base may comprise an L-type zeolite. L-type zeolite supports are a sub-group of zeolitic supports, which may contain mole ratios of oxides in accordance with the formula: $M_{2/n}OAl_2O_3xSiO_2yH_2O$. In this formula, "M" designates an exchangeable cation (one or more) such as barium, calcium, cerium, lithium, magnesium, potassium, sodium, strontium, and/or zinc, as well as non-metallic cations like hydronium and ammonium ions, which may be replaced by other exchangeable cations without causing a substantial alteration of the basic crystal structure of the L-type zeolite. The "n" in the formula represents the valence of "M"; "x" is 2 or greater; and "y" is the number of water molecules contained in the channels or interconnected voids of the zeolite.

In one aspect, the bound zeolite base may comprise a bound potassium L-type zeolite, also referred to as a K/L-zeolite, while in another aspect, the bound zeolite base may comprise a barium ion-exchanged L-zeolite. As used herein, the term "K/L-zeolite" refers to L-type zeolites in which the principal cation M incorporated in the zeolite is potassium. A K/L-zeolite may be cation-exchanged (e.g., with barium) or impregnated with a transition metal and one or more halides to produce a transition metal impregnated, halided zeolite or a K/L supported transition metal-halide zeolite catalyst.

In the bound zeolite base, the zeolite may be bound with a support matrix (or binder), and non-limiting examples of binders may include, but are not limited to, inorganic solid oxides, clays, and the like, as well as combinations thereof. The zeolite may be bound with the binder or support matrix using any method known in the art. For instance, the bound zeolite base in step (a)—comprising a zeolite and a binder—may be produced by a process comprising mixing a zeolite, such as a K/L-zeolite, with a binder, such as silica, then extruding the mixture, and then drying and calcining.

In some aspects, the binder may comprise alumina, silica, magnesia, boria, titania, zirconia, or a mixed oxide thereof (e.g., an aluminosilicate), or a mixture thereof, while in other aspects, the binder may comprise a montmorillonite, a kaolin, a cement, or a combination thereof. In a particular aspect contemplated herein, the binder may comprise silica, alumina, or a mixed oxide thereof; alternatively, silica; alternatively, alumina; or alternatively, silica-alumina. Accordingly, the bound zeolite base may comprise a silica-bound L-zeolite, such as a silica-bound Ba/L-zeolite, or a silica-bound K/L-zeolite.

While not being limited thereto, bound zeolite bases encompassed herein may comprise from about 3 wt. % to about 35 wt. % binder. For example, the bound zeolite base may comprise from about 5 wt. % to about 30 wt. %, or from about 10 wt. % to about 30 wt. % binder. These weight percentages are based on the total weight of the bound zeolite base, excluding transition metal and halogen, for example.

Illustrative examples of bound zeolite bases and their use in supported catalysts are described in U.S. Pat. Nos. 5,196,631, 6,190,539, 6,406,614, 6,518,470, 6,812,180, and 7,153,801, the disclosures of which are incorporated herein by reference in their entirety.

Referring now to step (b), also referred to as the washing step, in which the bound zeolite base may be washed with any suitable aqueous solution comprising an alkali metal (or a mixture of alkali metals), resulting in an alkali metal enriched zeolite support. The alkali metal in step (b) may be any Group 1 element. For instance, the alkali metal may comprise (or consist essentially of, or consist of) potassium, rubidium, or cesium, as well as combinations thereof. In some aspects, the alkali metal may comprise (or consist essentially of, or consist of) potassium; alternatively, rubidium; or alternatively, cesium.

The aqueous solution used in the washing step may contain the alkali metal (or metals) in any suitable form, but often, the aqueous solution contains a salt of the alkali metal. Illustrative salts may include, but are not limited to, chlorides, fluorides, bromides, iodides, nitrates, and the like, as well as combinations thereof. While not wishing to be bound by the following theory, it is believed that nitrates may be detrimental due to the potential for NOx production during subsequent processing. Accordingly, in particular aspects of this invention, the aqueous solution in the washing step may comprise an alkali metal halide salt, such as potassium chloride, rubidium chloride, or cesium chloride, as well as mixtures thereof.

In addition to water and the alkali metal, the aqueous solution used in the washing step may contain other components, as would be recognized by those of skill in the art. However, in some aspects, the washing step may comprise contacting the bound zeolite base with an aqueous solution consisting essentially of, or consisting of, the alkali metal salt and water, or the alkali metal salt and deionized water. In these and other aspects, the aqueous solution used in the washing step (and optionally, any steps in the methods after step (a)) may be substantially free of a basic compound (e.g., a hydroxide), and/or substantially free of ammonia or any ammonium-containing compounds, and/or substantially free of sulfur or any sulfur-containing compounds. In these circumstances, "substantially free" is meant to contain less than 100 ppmw (ppm by weight), independently, of any of these materials, and more typically, less than 75 ppmw, less than 50 ppmw, less than 25 ppmw, or less than 10 ppmw. Therefore, it is contemplated that the individual amount of any of these materials in the aqueous solution (or used in any steps of the methods after step (a)) may be in range from about 0.1 ppmw to 100 ppmw, from about 0.1 ppmw to 75 ppmw, from about 1 ppmw to 100 ppmw, from about 1 ppmw to about 75 ppmw, from about 0.1 ppmw to about 50 ppmw, from about 1 ppmw to about 50 ppmw, or from about 1 ppmw to about 25 ppmw. While not wishing to be bound by theory, it is believed that it may be beneficial to have substantially none of these materials present during the washing step in the disclosed methods for preparing a supported catalyst, as these materials may adversely affect one or more of the catalyst activity, catalyst selectivity, catalyst lifetime and/or catalyst deactivation. Moreover, although not required, the aqueous solution (and any steps in the methods after step (a)) may be substantially free of sodium or any sodium-containing compound, i.e., may contain less than 100 ppmw (ppm by weight) of sodium or sodium-containing compounds. As above, it is contemplated that the amount may be, for instance, less than 75 ppmw, less than 50 ppmw, less than 25 ppmw, in a range from about 0.1 ppmw to 100 ppmw, in a range from about 0.1 ppmw to about 75 ppmw, or in a range from about 1 ppmw to about 75 ppmw, and the like.

Thus, in some aspects, the alkali metal used in the washing step is not sodium, but is one or more of potassium, rubidium, and/or cesium. Additionally or alternatively, step (b) in the disclosed methods may be the only step in the method of making a supported catalyst that utilizes an alkali metal, for example, an alkali metal salt.

In the washing step, the pH of the aqueous solution is not limited to any particular range. Generally, however, the pH may be in the 6-8 range, depending upon the alkali metal salt utilized and its respective concentration.

While not being limited thereto, the amount of the alkali metal in the aqueous solution often may be less than about 5 M (mole/L). For instance, the aqueous solution may have a concentration of the alkali metal of less than about 1 M, less than about 0.75 M, less than about 0.5 M, less than about 0.3 M, less than about 0.25 M, or less than about 0.2 M. Therefore, suitable ranges for the concentration of the alkali metal may include, but are not limited to, the following ranges: from about 0.01 M to about 5 M, from about 0.01 M to about 1 M, from about 0.01 M to about 0.5 M, from about 0.01 M to about 0.45 M, from about 0.01 M to about 0.3 M, from about 0.01 M to about 0.25 M, from about 0.01 M to about 0.2 M, from about 0.05 M to about 1 M, from about 0.05 M to about 0.5 M, from about 0.05 M to about 0.45 M, from about 0.05 M to about 0.3 M, from about 0.05 M to about 0.25 M, or from about 0.05 M to about 0.2 M, and the like.

Unexpectedly, it was found that lower concentrations of cesium in the washing step may be beneficial for improved catalyst activity and selectivity. In these aspects, the concentration of the cesium (or the cesium salt) in the aqueous solution may fall within a range from about 0.01 M to about 0.25 M, from about 0.01 M to about 0.2 M, from about 0.01 M to about 0.15 M, from about 0.025 M to about 0.25 M, from about 0.025 M to about 0.2 M, from about 0.025 M to about 0.15 M, from about 0.05 M to about 0.25 M, or from about 0.05 M to about 0.2 M.

Also unexpectedly, it was found that slightly higher concentrations of potassium in the washing step may be beneficial for improved catalyst activity and selectivity. In these aspects, the concentration of the potassium (or the potassium salt) in the aqueous solution may fall within a range from about 0.1 M to about 0.45 M, from about 0.15 M to about 0.45 M, from about 0.15 M to about 0.35 M, from about 0.15 M to about 0.3 M, from about 0.2 M to about 0.45 M, from about 0.2 M to about 0.35 M, or from about 0.2 M to about 0.3 M The washing step containing the alkali metal may be conducted at a variety of temperatures and time periods. For instance, the washing step may be conducted at a washing temperature in a range from about 15° C. to about 95° C.; alternatively, from about 15° C. to about 80° C.; alternatively, from about 15° C. to about 70° C.; alternatively, from about 15° C. to about 65° C.; alternatively, from about 20° C. to about 95° C.; alternatively, from about 20° C. to about 80° C.; alternatively, from about 20° C. to about 70° C.; alternatively, from about 20° C. to about 50° C.; alternatively, from about 30° C. to about 80° C.; alternatively, from about 30° C. to about 70° C.; alternatively, from about 30° C. to about 50° C.; alternatively, from about 25° C. to about 55° C.; or alternatively, from about 30° C. to about 45° C. In these and other aspects, these temperature ranges also are meant to encompass circumstances where the washing step is conducted at a series of different temperatures, instead of at a single fixed temperature, falling within the respective ranges.

The washing step containing the alkali metal may be conducted by performing more than one washing cycle containing the alkali metal, such as from 1 to 4 washing cycles, from 2 to 8 washing cycles, or from 2 to 4 washing cycles. Thus, for example, the washing step may comprise from 1 to 4 washing cycles, from 2 to 8 washing cycles, or from 2 to 4 washing cycles, with each washing cycle, independently, ranging from about 1 minute to about 6 hours, from about 5 minutes to about 2 hours, from about 10 minutes to about 45 minutes, or from about 10 minutes to about 30 minutes, and so forth.

The duration of a single washing cycle containing the alkali metal is not limited to any particular period of time. Hence, a washing cycle may be conducted, for example, in a time period ranging from as little as 1-5 minutes to as long as 2-4 hours, 6-8 hours, or more. The appropriate washing cycle time may depend upon, for example, the washing temperature, the amount of alkali metal in the aqueous solution, and the number of washing cycles, among other variables. Generally, however, the washing cycle step may be conducted in a time period that may be in a range from about 1 minute to about 6 hours, such as, for example, from about 1 minute to about 2 hours, from about 5 minutes to about 2 hours, from about 5 minutes to about 1 hour, from about 10 minutes to about 1 hour, from about 5 minutes to about 45 minutes, from about 10 minutes to about 45 minutes, or from about 10 minutes to about 30 minutes.

Generally, the amount of the aqueous solution—containing the alkali metal—used in the washing step (or in each washing cycle) relative to the amount of the bound zeolite base is not particularly limited. In one aspect, for instance, the ratio of the weight of the aqueous solution to the weight of the bound zeolite base may fall within a range of from about 0.4:1 to about 50:1, or from about 0.5:1 to about 25:1. In another aspect, the ratio of the weight of the aqueous solution to the weight of the bound zeolite base may range from about 0.4:1 to about 10:1, or from about 0.5:1 to about 10:1. In yet another aspect, the ratio of the weight of the aqueous solution to the weight of the bound zeolite base may range from about 0.5:1 to about 8:1, or from about 0.5:1 to about 5:1. In still another aspect, the ratio of the weight of the aqueous solution to the weight of the bound zeolite base may range from about 1:1 to about 15:1, or from about 1:1 to about 5:1.

The washing step containing the alkali metal may be conducted using any suitable technique and equipment. For instance, the bound zeolite base may be placed into a vessel or tank, and then filled with enough of the aqueous solution containing the alkali metal to exceed the level of the bound zeolite base in the vessel or tank. Optionally, agitation may be provided in the vessel and tank to increase the contact between the bound zeolite base and the alkali metal within the aqueous solution. Alternatively, the bound zeolite base may be placed in a fixed or packed bed arrangement, and the aqueous solution containing the alkali metal may be contacted with the bound zeolite by flowing the aqueous solution through the bed of the bound zeolite base. As would be recognized by those of skill in the art, other suitable techniques and equipment may be employed for the washing step, and such techniques and equipment are encompassed herein.

Although not required, the washing step may be completed by performing one or more washing cycles without an alkali metal, such as from 1 to 4 washing cycles. The washing conditions may be the same as those described herein for washing steps with an alkali metal.

In step (b) of the methods for producing supported catalyst disclosed herein, the bound zeolite base may be washed with an aqueous solution comprising an alkali metal to produce an alkali metal "enriched" zeolite support. In effect, the washing step may enrich the bound zeolite base with any suitable or desired amount of alkali metal, wherein the amount of enrichment is the difference in the amount of the alkali metal in the alkali metal enriched zeolite support versus the amount of the alkali metal in the bound zeolite base. While not being limited thereto, the washing step may enrich the bound zeolite base with from about 0.03 moles to about 1.5 moles of the alkali metal per kg of the bound zeolite base (or per kg of the alkali metal enriched zeolite support); alternatively, from about 0.03 moles to about 1 mole of the alkali metal per kg of the bound zeolite base (or per kg of the alkali metal enriched zeolite support); alternatively, from about 0.03 moles to about 0.7 moles of the alkali metal per kg of the bound zeolite base (or per kg of the alkali metal enriched zeolite support); alternatively, from about 0.05 moles to about 1 mole of the alkali metal per kg of the bound zeolite base (or per kg of the alkali metal enriched zeolite support); alternatively, from about 0.1 moles to about 1.2 moles of the alkali metal per kg of the bound zeolite base (or per kg of the alkali metal enriched zeolite support); alternatively, from about 0.1 moles to about 0.9 moles of the alkali metal per kg of the bound zeolite base (or per kg of the alkali metal enriched zeolite support); alternatively, from about 0.2 moles to about 0.8 moles of the alkali metal per kg of the bound zeolite base (or per kg of the alkali metal enriched zeolite support); or alternatively, from about 0.3 moles to about 0.7 moles of the alkali metal per kg of the bound zeolite base (or per kg of the alkali metal enriched zeolite support). As an example, a bound zeolite base (containing no cesium) may be washed with an aqueous solution containing a cesium salt (in one or more washing cycles conducted at any temperature, washing time, and relative amount of the aqueous solution disclosed herein) to produce a cesium enriched zeolite support containing about 0.5 moles of cesium per kg of the bound zeolite base (or about 0.5 moles of cesium per kg of the cesium enriched zeolite support). As another example, a bound zeolite base (such as a bound K/L-zeolite containing about 3 moles of potassium per kg of the bound K/L-zeolite) may be washed with an aqueous solution containing a potassium salt (in one or more washing cycles conducted at any temperature, washing time, and relative amount of the aqueous solution disclosed herein) to produce a potassium enriched zeolite support containing about 3.1 moles of potassium per kg of the bound K/L-zeolite (or about 3.1 moles per kg of the potassium enriched K/L-zeolite support).

As those of skill in the art will readily recognize, the alkali metal enrichment due to the incorporation of an alkali metal during the washing of the bound zeolite base may be accomplished by various combinations of conditions that may be used in step (b). Once a desired level of alkali metal enrichment is selected, this result may be achieved by many different combinations of the number of washing cycles, the washing time, the washing temperature, the molar concentration of the alkali metal in the aqueous solution, the relative amount of aqueous solution used based on the weight of the bound zeolite base, and so forth.

In addition to producing an alkali metal enriched zeolite support during the washing step, the level of sodium may be reduced, assuming that the bound zeolite base contains sodium and the aqueous solution does not. In these circumstances, the resultant alkali metal enriched zeolite support may contain less than about 0.35 wt. % sodium, or less than about 0.3 wt. % sodium, based on the weight of the alkali metal enriched zeolite support. In some aspects, the amount of sodium in the alkali metal enriched zeolite support may range from about 0.03 wt. % to about 0.35 wt. %, from about 0.05 wt. % to about 0.3 wt. %, from about 0.01 wt. % to about 0.25 wt. %, or from about 0.03 wt. % to about 0.2 wt. % sodium, based on the total weight of the zeolite support.

Once the alkali metal enriched zeolite support has been produced in step (b), optionally, the alkali metal enriched zeolite support may be dried and/or calcined prior to step (c). If both drying and calcining are performed, typically the alkali metal enriched zeolite support is dried and then calcined.

If a drying step is performed, the drying step usually involves contacting the alkali metal enriched zeolite support with a drying gas stream comprising (or consisting essentially, or consisting of) an inert gas (e.g., nitrogen), oxygen, air, or any mixture or combination thereof; alternatively, nitrogen; alternatively, helium; alternatively, neon; alternatively, argon; alternatively, oxygen; or alternatively, air. While not being limited thereto, the drying step generally may be conducted at a drying temperature in a range from about 80° C. to about 200° C.; alternatively, from about 100° C. to about 200° C.; alternatively, from about 85° C. to about 175° C.; or alternatively, from about 100° C. to about 150° C. In these and other aspects, these temperature ranges also are meant to encompass circumstances where the drying step is conducted at a series of different temperatures, instead of at a single fixed temperature, falling within the respective ranges.

The duration of the drying step is not limited to any particular period of time. Typically, the drying step may be conducted in a time period ranging from as little as 30 minutes to as long as 8 hours (or more), but more typically, the drying step may be conducted in a time period that may be in a range from about 1 hour to about 8 hours, such as, for example, from about 1 hour to about 7 hours, from about 1 hour to about 6 hours, from about 2 hours to about 7 hours, or from about 2 hours to about 6 hours.

If a calcining step is performed, the calcining step may be conducted at a variety of temperatures and time periods. Typical peak calcining temperatures often fall within a range from about 315° C. to about 600° C., such as from about 375° C. to about 600° C., from about 400° C. to about 550° C., or from about 425° C. to about 500° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges. For instance, the calcination step may start at an initial temperature which is the same as the drying temperature in the drying step. Subsequently, the temperature of the calcination may be increased over time to a peak calcining temperature, for example, in a range from about 375° C. to about 600° C.

The duration of the calcining step is not limited to any particular period of time. Hence, the calcining step may be conducted, for example, in a time period ranging from as little as 30-45 minutes to as long as 10-12 hours, or more. The appropriate calcining time may depend upon, for example, the initial/peak calcining temperature and whether a drying step is used, among other variables. Generally, however, the calcining step may be conducted in a time period that may be in a range from about 45 minutes to about 12 hours, such as, for example, from about 1 hour to about 12 hours, from about 1 hour to about 10 hours, from about 1 hour to about 5 hours, or from about 1 hour to about 3 hours.

The calcining step may be conducted in a calcining gas stream that comprises (or consists essentially of, or consists of) an inert gas (e.g., nitrogen), oxygen, air, or any mixture or combination thereof. In some aspects, the calcining gas stream may comprise air, while in other aspects, the calcining gas stream may comprise a mixture of air and nitrogen. Yet, in certain aspects, the calcining gas stream may be an inert gas, such as nitrogen and/or argon.

Referring now to step (c) of the method for producing a supported catalyst, the alkali metal enriched zeolite support may be impregnated with a transition metal and a halogen to produce the supported catalyst. Non-limiting examples of suitable transition metals may include iron, cobalt, nickel, ruthenium, rhodium, palladium, osmium, iridium, platinum, gold, silver, copper, and the like, or a combination of two or more transition metals. In one aspect, the transition metal may comprise a Group 8-11 transition metal or a Group 8-10 transition metal (one or more), while in another aspect, the transition metal may comprise platinum (Pt). In yet another aspect, the alkali metal enriched zeolite support is impregnated with only one transition metal, and the transition metal is platinum.

The transition metal may be added to the zeolitic support by any suitable method or technique known to those of skill in the art that results in adequate dispersion of the transition metal on the support. One such method involves mixing the alkali metal enriched zeolite support with a transition metal-containing compound, where the transition-metal containing compound may be present in a solution of any suitable solvent, such as water. Illustrative and non-limiting examples of transition metal-containing compounds that are suitable for use in impregnating the zeolitic support with platinum include, but are not limited to, tetraamineplatinum (II) chloride, tetraamineplatinum(II) nitrate, platinum(II) acetyl acetonate, platinum(II) chloride, ammonium tetrachloroplatinate(II), chloroplatinic acid, platinum (II) nitrate, and the like, as well as mixtures or combinations thereof.

In one aspect, the supported catalyst may comprise from about 0.1 wt. % to about 10 wt. % transition metal. In another aspect, the supported catalyst may comprise from about 0.2 wt. % to about 5 wt. % transition metal. In yet another aspect, the supported catalyst may comprise from about 0.3 wt. % to about 3 wt. % transition metal, or from about 0.3 wt. % to about 2 wt. % transition metal. These weight percentages are based on the total weight of the supported catalyst.

In circumstances where the transition metal comprises platinum, the supported catalyst may comprise from about 0.1 wt. % to about 10 wt. % platinum; alternatively, from about 0.2 wt. % to about 5 wt. % platinum; alternatively, from about 0.3 wt. % to about 3 wt. % platinum; or alternatively, from about 0.3 wt. % to about 2 wt. % platinum. In a particular aspect contemplated herein, the supported catalyst may comprise platinum on a bound K/L-zeolite that has been enriched with an alkali metal.

In addition to impregnating the alkali metal enriched zeolite support with a transition metal, such as platinum, the alkali metal enriched zeolite support may be impregnated with a halogen to produce the supported catalyst. Typically, the halogen comprises chlorine and/or fluorine. Thus, chlorine or fluorine may be utilized singly, or both chlorine and fluorine may be used. The halogen (one or more) may be added to the zeolitic support before, during and/or after the addition of the transition metal.

The halogen(s) may be added to the zeolitic support by any suitable method or technique known to those of skill in the art. One such method involves contacting or mixing the alkali metal enriched zeolite support with a chlorine-containing compound and/or a fluorine-containing compound, and in any order or sequence. In one aspect, the alkali metal enriched zeolite support may be mixed with a solution of the chlorine-containing compound and/or fluorine-containing compound in any suitable solvent. Illustrative and non-limiting examples of chlorine-containing compounds include hydrochloric acid, carbon tetrachloride, tetrachloroethylene, chlorobenzene, methyl chloride, methylene chloride, chloroform, allyl chloride, trichloroethylene, a chloramine, a chlorine oxide, a chlorine acid, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, and the like, as well as combinations thereof. Illustrative and non-limiting examples of fluorine-containing compounds include hydrofluoric acid, 2,2,2-trifluoroethanol, tetrafluoroethylene, carbon tetrafluoride, carbon trifluoride, fluoromethane, heptafluoropropane, decafluorobutane, hexafluoroisopropanol, tetrafluoropropanol, pentafluoropropanol, hexafluorophenylpropanol, perfluorobutyl alcohol, hexafluor-2-propanol, pentafluoro-1-propanol, tetrafluoro-1-propanol, 1,1,1,3,3,3-hexafluoro-2-propanol, 2,2,3,3,3-pentafluoro-1-propanol, ammonium fluoride, tetramethylammonium fluoride, tetraethyl ammonium fluoride, tetrapropylammonium fluoride, tetrabutylammonium fluoride, methyltriethylammonium fluoride, and the like, as well as combinations thereof.

In another aspect, the alkali metal enriched zeolite support may be impregnated with the halogen(s) in the vapor phase. For instance, the zeolitic support may be contacted with a chlorine-containing stream comprising a chlorine-containing compound and/or a fluorine-containing stream comprising a fluorine-containing compound, and in any order or sequence. Suitable chlorine-containing compounds and fluorine-containing compounds include those listed hereinabove, as well as chlorine gas ($Cl_2$) and fluorine gas ($F_2$).

When present, the amount of chlorine (Cl), based on the total weight of the supported catalyst, often falls within a range from about 0.05 wt. % to about 5 wt. %, from about 0.1 wt. % to about 1.5 wt. %, from about 0.2 wt. % to about 1 wt. %, or from about 0.5 wt. % to about 1.5 wt. % chlorine. Likewise, when present, the amount of fluorine (F), based on the total weight of the supported catalyst, often falls within a range from about 0.05 wt. % to about 5 wt. %, from about 0.1 wt. % to about 1.5 wt. %, from about 0.2 wt. % to about 1 wt. %, or from about 0.5 wt. % to about 1.5 wt. % fluorine.

Once the supported catalyst has been produced in step (c), optionally, the supported catalyst may be dried and/or calcined. If both drying and calcining are performed, typically the supported catalyst is dried and then calcined. Any suitable temperatures, pressures, durations, and atmospheres may be used in the drying and calcining steps. In some aspects, the step of drying the supported catalyst may be performed similarly to the step of drying the alkali metal enriched zeolite support described hereinabove (e.g., temperature ranges, ranges of times, inert or oxidizing atmospheres, and so forth). In some aspects, the drying step may be performed at any suitable sub-atmospheric pressure, such as less than 125 torr, less than 100 torr, or less than 50 torr.

The supported catalyst in step (c) may be calcined. If a calcining step is performed, the calcining step may be conducted at a variety of temperatures and time periods. Typical peak calcining temperatures often fall within a range from about 175° C. to about 450° C., such as from about 200° C. to about 400° C., from about 225° C. to about 350° C., or from about 250° C. to about 300° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges. For instance, the calcination step may start at an initial temperature which is the same as the drying temperature in the drying step. Subsequently, the temperature of the calcination may be increased over time to a peak calcining temperature, for example, in a range from about 375° C. to about 600° C.

The duration of the calcining step is not limited to any particular period of time. Hence, the calcining step may be conducted, for example, in a time period ranging from as little as 30-45 minutes to as long as 10-12 hours, or more. The appropriate calcining time may depend upon, for example, the initial/peak calcining temperature and whether a drying step is used, among other variables. Generally, however, the calcining step may be conducted in a time period that may be in a range from about 45 minutes to about 12 hours, such as, for example, from about 1 hour to about 12 hours, from about 1 hour to about 10 hours, from about 1 hour to about 5 hours, or from about 1 hour to about 3 hours.

The calcining step may be conducted in a calcining gas stream that comprises (or consists essentially of, or consists of) an inert gas (e.g., nitrogen), oxygen, air, or any mixture or combination thereof. In some aspects, the calcining gas stream may comprise air, while in other aspects, the calcining gas stream may comprise a mixture of air and nitrogen. Yet, in certain aspects, the calcining gas stream may be an inert gas, such as nitrogen and/or argon.

The methods for preparing a supported catalyst disclosed herein may further comprise a reducing step after step (c). This reducing step may comprise contacting the supported catalyst with a reducing gas stream comprising hydrogen. Often, the reducing gas stream comprises molecular hydrogen, either alone or with an inert gas, such as helium, neon, argon, nitrogen, and the like, and this includes combinations of two or more of these inert gasses. In certain aspects, the reducing gas stream may comprise (or consist essentially of, or consist of) molecular hydrogen and nitrogen. Moreover, molecular hydrogen may be the major component of the reducing gas stream (greater than 50 mol %), while in other aspects, molecular hydrogen may be a minor component (between 5-35 mol %).

The reducing step may be conducted at a variety of temperatures and time periods. For instance, the reducing step may be conducted at a reducing temperature in a range from about 100° C. to about 700° C.; alternatively, from about 200° C. to about 600° C.; alternatively, from about 200° C. to about 575° C.; alternatively, from about 350° C. to about 575° C.; alternatively, from about 400° C. to about 550° C.; or alternatively, from about 450° C. to about 550° C. In these and other aspects, these temperature ranges also are meant to encompass circumstances where the reducing step is conducted at a series of different temperatures, instead of at a single fixed temperature, falling within the respective ranges.

The duration of the reducing step is not limited to any particular period of time. Hence, the reducing step may be conducted, for example, in a time period ranging from as little as 1 hour to as long as 48-72 hours, or more. For example, the reducing step may be conducted in a time period that may be in a range from about 2 hours to about 48 hours, from about 3 hours to about 36 hours, from about 5 hours to about 36 hours, from about 2 hours to about 30 hours, or from about 10 hours to about 30 hours.

In some aspects, the supported catalyst may contain from about 0.05 moles to about 1.5 moles of the alkali metal per kg of the supported catalyst, while in other aspects, the supported catalyst may contain from about 0.05 moles to about 1 mole of the alkali metal per kg of the supported catalyst. For instance, the supported catalyst may contain from about 0.05 moles to about 0.7 moles of the alkali metal, from about 0.1 moles to about 0.9 moles of the alkali metal, from about 0.2 moles to about 0.8 moles of the alkali metal, or from about 0.3 moles to about 0.7 moles of the alkali metal, per kg of the supported catalyst. In these and other aspects, the supported catalyst may contain from about 10,000 ppm to about 125,000 ppm (by weight; from about 1 wt. % to about 12.5 wt. %) of the alkali metal, such as from about 20,000 ppm to about 100,000 ppm of the alkali metal, from about 25,000 ppm to about 110,000 ppm of the alkali metal, from about 30,000 ppm to about 90,000 ppm of the alkali metal, or from about 40,000 ppm to about 85,000 ppm of the alkali metal, based on the total weight of the supported catalyst.

The supported catalysts produced in accordance with this invention may have a surface area less than that of a catalyst obtained by washing the bound zeolite base with an aqueous solution that does not contain an alkali metal, under the same catalyst preparation conditions. Illustrative and non-limiting examples of suitable ranges for the surface area of the supported catalyst include from about 100 $m^2/g$ to about 170 $m^2/g$, from about 100 $m^2/g$ to about 150 $m^2/g$, from about 105 $m^2/g$ to about 170 $m^2/g$, or from about 105 $m^2/g$ to about 160 $m^2/g$. Likewise, illustrative and non-limiting examples of suitable ranges for the surface area of the alkali metal enriched zeolite support include from about 120 $m^2/g$ to about 250 $m^2/g$, from about 130 $m^2/g$ to about 230 $m^2/g$, from about 150 $m^2/g$ to about 240 $m^2/g$, or from about 160 $m^2/g$ to about 220 $m^2/g$.

In similar fashion, the supported catalysts produced in accordance with this invention may have a micropore volume less than that of a catalyst obtained by washing the bound zeolite base with an aqueous solution that does not contain an alkali metal, under the same catalyst preparation conditions. Illustrative and non-limiting examples of suitable ranges for the micropore volume of the supported catalyst may include from about 0.015 cc/g to about 0.05 cc/g, from about 0.02 cc/g to about 0.045 cc/g, from about 0.025 cc/g to about 0.045 cc/g, or from about 0.0265 cc/g to about 0.045 cc/g. Likewise, illustrative and non-limiting examples of suitable ranges for the micropore volume of the alkali metal enriched zeolite support include from about 0.025 cc/g to about 0.08 cc/g, from about 0.03 cc/g to about 0.07 cc/g, from about 0.04 cc/g to about 0.08 cc/g, or from about 0.045 cc/g to about 0.075 cc/g.

Beneficially, the alkali metal enriched supported catalysts disclosed herein may have excellent platinum dispersion, despite the reduced surface area and micropore volume. Often, the platinum dispersion falls within a range from about 50% to about 70%, from about 52% to about 62%, from about 55% to about 70%, from about 55% to about 65%, or from about 55% to about 60%.

Reforming Processes with Aromatization Catalysts

Also encompassed herein are various processes for reforming hydrocarbons. One such reforming process may comprise (or consist essentially of, or consist of) contacting a hydrocarbon feed with a supported aromatization catalyst under reforming conditions in a reactor system to produce an aromatic product. The supported aromatization catalyst used in the reforming process may be any supported catalyst disclosed herein and/or may be produced by any method for producing a supported catalyst disclosed herein.

The reactor systems for reforming and the respective reforming conditions are well known to those of skill in the art and are described, for example, in U.S. Pat. Nos. 4,456,527, 5,389,235, 5,401,386, 5,401,365, 6,207,042, and 7,932,425, the disclosures of which are incorporated herein by reference in their entirety.

Likewise, typical hydrocarbon feeds are disclosed in these references. Often, the hydrocarbon feed may be a naptha stream or light naptha stream. In certain aspects, the hydrocarbon feed may comprise non-aromatic hydrocarbons, for example, the hydrocarbon feed may comprise $C_6$-$C_9$ alkanes and/or cycloalkanes, or $C_6$-$C_8$ alkanes and/or cycloalkanes (e.g., hexane, heptane, cyclohexane), and the like.

The supported catalyst disclosed herein may be characterized by a $T_{EOR}$ (end of run temperature) as described herein, which often may fall within a range from about 499° C. (930° F.) to about 530° C. (986° F.), from about 499° C. (930° F.) to about 524° C. (975° F.), from about 499° C. (930° F.) to about 515° C. (959° F.), or from about 501° C. (934° F.) to about 521° C. (970° F.).

Despite the reduced surface area and pore volume of the alkali metal enriched supported catalysts, these catalysts—in addition to an aromatics yield, quantified by the $T_{EOR}$, that is comparable to supported catalysts without the alkali metal enrichment—also may have unexpected improvements in selectivity. For instance, the supported catalysts disclosed herein may have a benzene selectivity (or a toluene selectivity) greater than that of a catalyst obtained by washing the bound zeolite base with an aqueous solution that does not contain an alkali metal, under the same catalyst preparation and aromatization reaction conditions. Such catalyst selectivity comparisons are meant to have the same amount of platinum and halogen on the catalyst, use the same bound zeolite base, tested on the same equipment and under the same test method and conditions, and so forth, such that the only difference is the use of the alkali metal (or not) during the washing step.

While not being limited thereto, typical benzene selectivities (and toluene selectivities) often may fall within a range from about 0.91 to about 0.97, from about 0.92 to about 0.98, from about 0.92 to about 0.97, from about 0.94 to about 0.98, from about 0.95 to about 0.98, from about 0.95 to about 0.975, or from about 0.95 to about 0.97, as determined using the testing procedure and conditions described herein.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Supported catalysts were tested for their performance in aromatization reactions using the following general procedure. The supported aromatization catalysts were ground and sieved to about 25-45 mesh, and 1 cc of the sieved catalyst was placed in a ⅜-inch OD stainless steel reactor vessel in a temperature controlled furnace. After reducing the catalyst under flowing molecular hydrogen, a feed stream of aliphatic hydrocarbons and molecular hydrogen was introduced to the reactor vessel at a pressure of 100 psig, a $H_2$:hydrocarbon molar ratio of 1.3, and a liquid hourly space velocity (LHSV) of 12 $hr^{-1}$ to obtain catalyst performance data over time. The aliphatic hydrocarbon feed contained approximately 0.61 mole fraction of convertible $C_6$ species and 0.21 mole fraction of convertible $C_7$ species. The balance was aromatics, $C_8+$, and highly branched isomers, which are classified as nonconvertibles. The reactor effluent composition was analyzed by gas chromatography to determine the amounts of the numerous feedstock components and product components, including benzene and toluene present (for selectivity calculations).

Catalyst performance was quantified by the temperature needed to obtain an aromatics yield of 63 wt. %. The $T_{EOR}$ (end of run temperature) is the temperature giving the desired yield at the end of the run, which was approximately 40 hours.

Alkali metal content (moles of alkali metals) of the alkali metal enriched zeolite support was determined by XRF or ICP. Weight percentages of Pt, Cl, and F were determined using X-ray fluorescence (XRF). Surface areas were determined using the BET method, and micropore volumes were determined using the t-plot method. Platinum dispersion was determined by CO Chemisorption.

Examples 1-5

A standard bound KL-zeolite consisting of approximately 17 wt. % silica binder was used as the starting material for Examples 1-5. The bound zeolite base was washed either with water (Example 1) or with water containing 0.1 M of an alkali metal salt (NaCl, KCl, RbCl, or CsCl—Examples 2-5). The washing conditions consisted of 3 wash cycles, each conducted at 100° F. for 20 minutes with the weight of the wash water (with or without alkali metal) being 2.5 times the weight of the bound zeolite base. The washing was performed batchwise with $N_2$ bubbling to agitate the mixture.

Table I summarizes the metals analysis of the alkali metal enriched zeolite supports after drying and calcining in air at 250° F. and 900° F., respectively. The alkali metal washing steps with rubidium or cesium (Examples 4-5) significantly reduced the amount of sodium in the support, and resulted in about 0.5 moles of the respective alkali metal (per kg) in the alkali metal enriched zeolite support. Alkali washing with potassium also reduced the amount of sodium in the support. As shown by Examples 4-5, alkali washing with rubidium or cesium also reduced the potassium content of the support.

The alkali metal enriched zeolite supports were subsequently impregnated with platinum and halogen, dried (at 95° C.), and calcined (at 900° F.) to form the supported aromatization catalysts. Pt, Cl, and F were added in one step via incipient wetness techniques. Final Pt, Cl, and F loadings were all approximately 1 wt. %. Table II summarizes the micropore volumes and surface areas of the alkali metal enriched zeolite supports and the supported catalysts after drying/calcining, as well as the platinum dispersion of the supported catalysts. In Table II, "support" is the alkali metal enriched zeolite support prior to platinum and halogen addition, and "catalyst" is the final supported catalyst containing platinum and halogen. Generally, the alkali metal washing steps with KCl, RbCl, or CsCl (Examples 3-5) reduced the surface area and the micropore volume of the alkali metal enriched zeolite support and the supported catalyst, with the cesium-enriched support and cesium-enriched catalyst having the lowest micropore volumes and surface areas. However, despite the impact of the alkali metal washing step on the micropore volume and surface area, the dispersion of the platinum on the supported catalyst was similar for each of Examples 1-5.

Additional experiments were conducted with potassium and cesium, similar to Example 3 and Example 5, respectively, in which the molar concentration of the alkali metal in the wash water was varied from 0.05 M to 0.3 M. FIG. 1 illustrates the impact of the molar concentration of potassium and cesium in the aqueous solution used to wash the bound zeolite base on the micropore volumes of the alkali metal enriched zeolite supports and the supported catalysts. Generally, as alkali metal concentration increased, the micropore volume decreased, although the decrease was not as significant for the supported catalyst as compared to that of the alkali metal enriched zeolite support.

Figure 2:
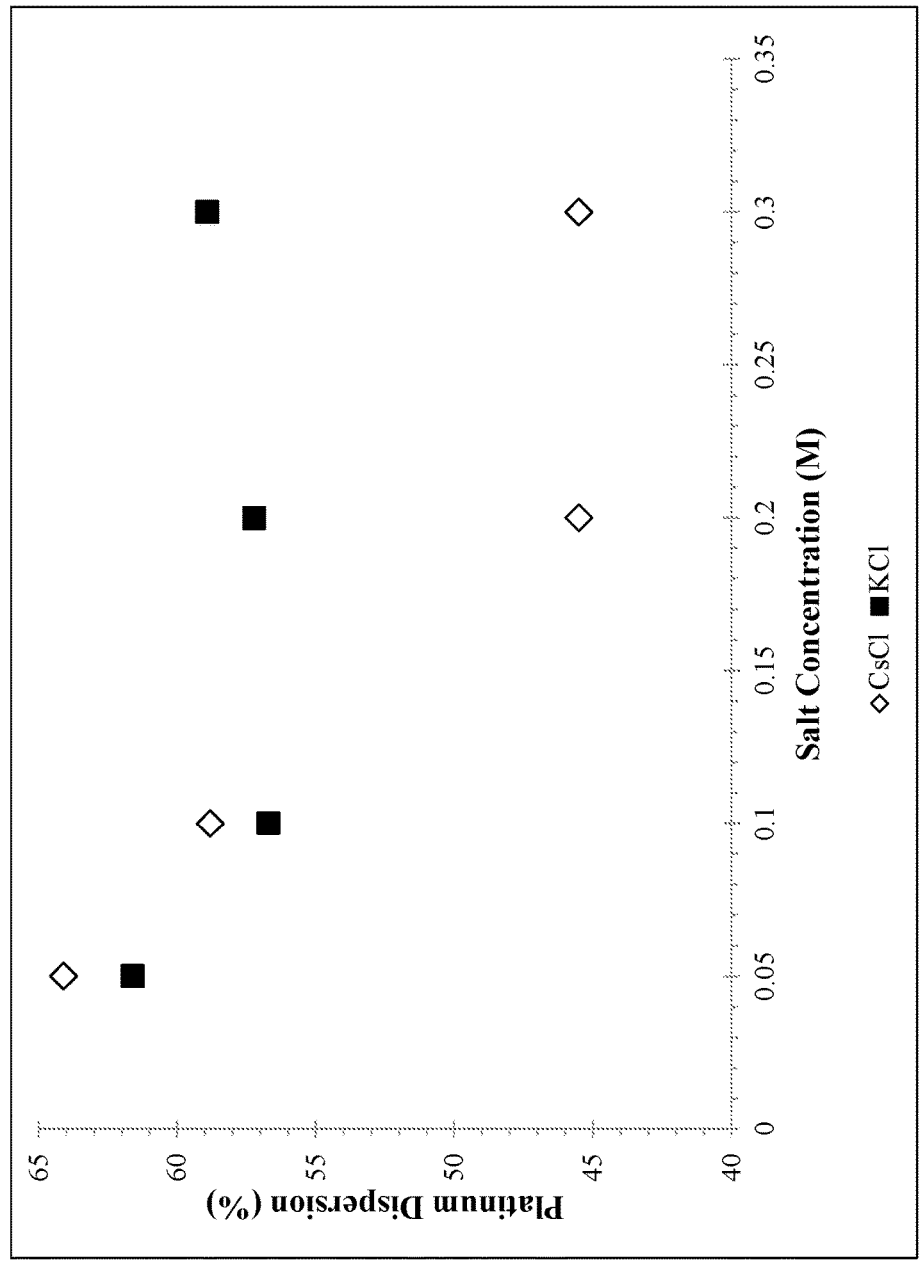
FIG. 2 presents a plot of the platinum dispersion of the supported catalyst versus the molar concentration of the alkali metal in the aqueous solution used to wash the bound zeolite base, for cesium and potassium alkali metals.

For the same 0.05 M to 0.3 M range of alkali metal concentration in the wash water, FIG. 2 illustrates the impact of the alkali metal concentration on the platinum dispersion on the supported catalyst. Unexpectedly, the platinum dispersion when using potassium was relatively unaffected throughout the concentration range, while when using cesium, the platinum dispersion dropped significantly at higher 0.2-0.3 M concentrations.

The supported catalysts of Examples 1-5, as characterized in Table I and Table II, were evaluated in aromatization reactions for their relative performance. Unexpectedly, given the reduction in surface area and pore volume for the alkali metal enriched supported catalysts of Examples 3-5 (see Table II), the aromatics yields as measured by the $T_{EOR}$ in Table III were similar for each of Examples 1-5. However, Table III demonstrates that the alkali metal enriched supported catalysts of Examples 3-5 had an unexpected improvement in benzene selectivity, with cesium enrichment increasing benzene selectivity of the supported catalyst to over 96%.

Figure 3:
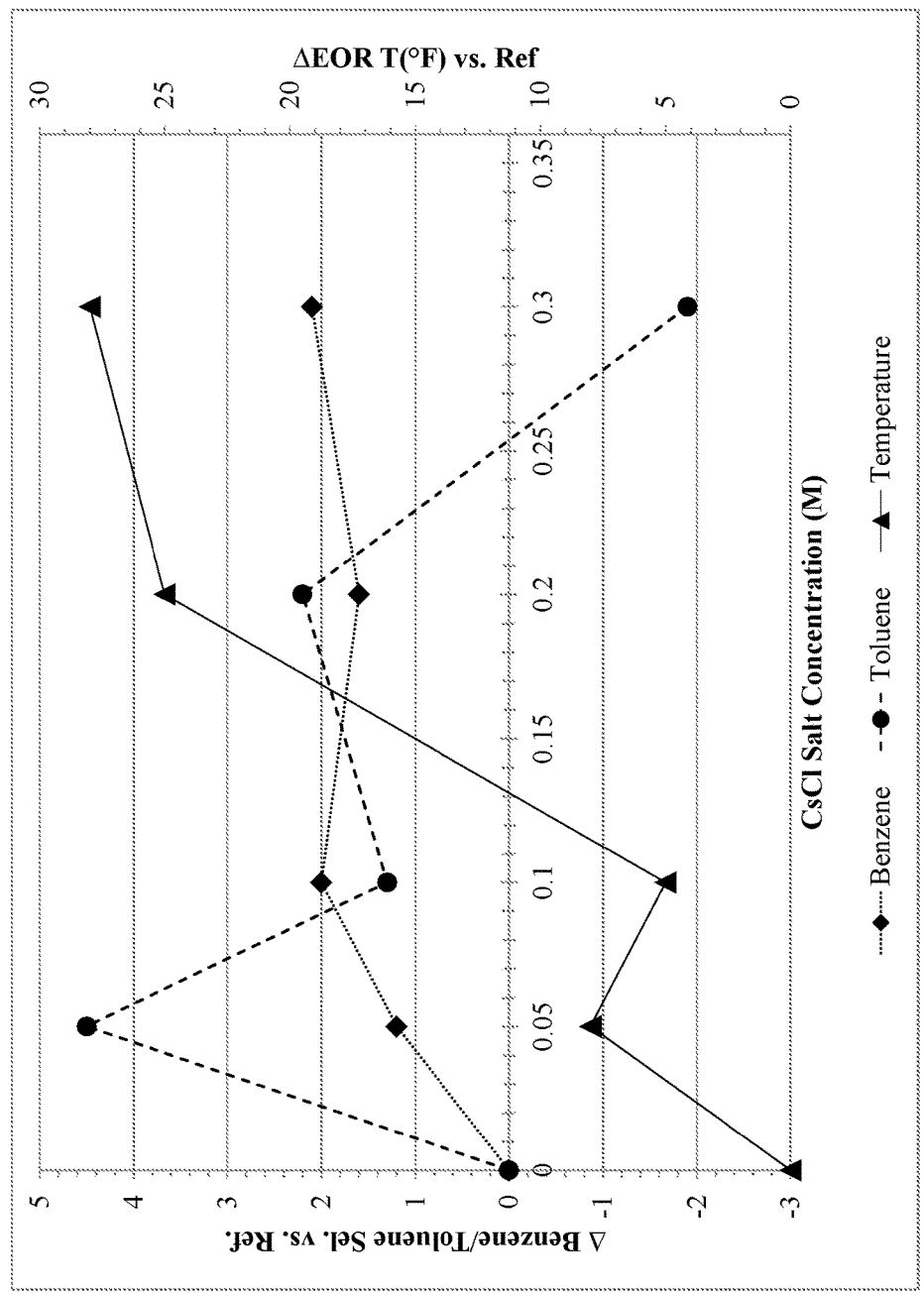
FIG. 3 presents a plot of the benzene selectivity, the toluene selectivity, and the end of run temperature for a cesium-enriched supported catalyst compared to a reference catalyst versus the molar concentration of the cesium in the aqueous solution used to wash the bound zeolite base.

Additional aromatization experiments were conducted with potassium and cesium enriched supported catalysts, similar to Example 3 and Example 5, respectively, in which the molar concentration of the alkali metal in the wash water was varied from 0.05 M to 0.3 M. FIG. 3 illustrates the impact of the molar concentration of cesium in the aqueous solution used to wash the bound zeolite base on the benzene selectivity, toluene selectivity, and the $T_{EOR}$ of the resultant supported catalysts. As compared to a reference (using no alkali metal in the washing step), it was surprisingly found that cesium concentrations of less than 0.2 M provided the beneficial combination of increased benzene selectivity, increased toluene selectivity, and a similar temperature needed ($T_{EOR}$) to obtain the desired aromatics yield.

Figure 4:
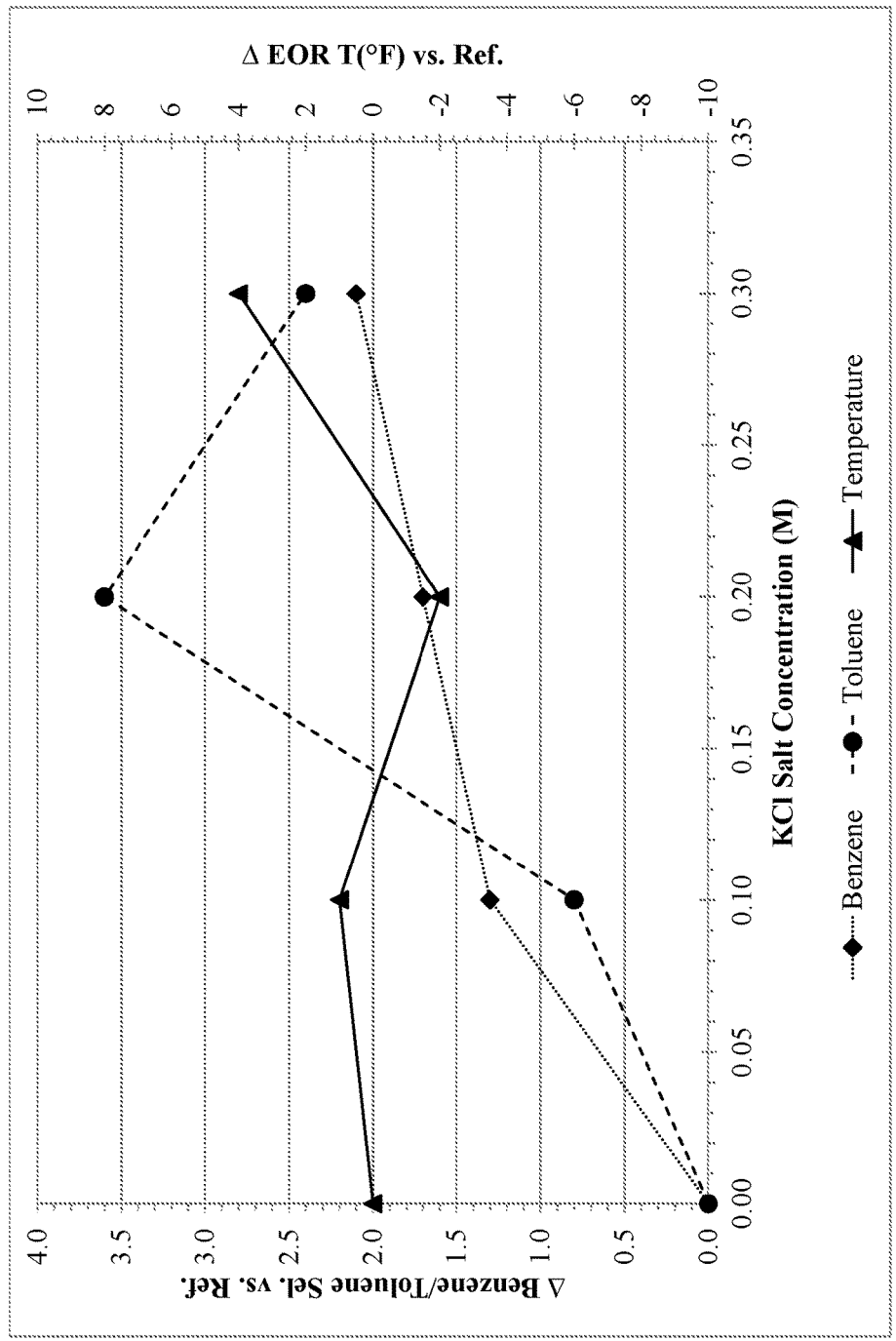
FIG. 4 presents a plot of the benzene selectivity, the toluene selectivity, and the end of run temperature for a potassium-enriched supported catalyst compared to a reference catalyst versus the molar concentration of the potassium in the aqueous solution used to wash the bound zeolite base.

Likewise, FIG. 4 illustrates the impact of the molar concentration of potassium in the aqueous solution used to wash the bound zeolite base on the benzene selectivity, toluene selectivity, and the $T_{EOR}$ of the resultant supported catalysts. As compared to a reference (using no alkali metal in the washing step), it was surprisingly found that potassium concentrations of 0.1 M and above provided the beneficial combination of increased benzene selectivity, increased toluene selectivity, and a similar temperature needed ($T_{EOR}$) to obtain the desired aromatics yield (no impact on temperature was evident).

TABLE I

Examples 1-5 - Alkali metal content.

| Example | Alkali Metal Wash Salt | Moles Na per kg | Moles K per kg | Moles Rb per kg | Moles Cs per kg | Total moles cation per kg |
|---|---|---|---|---|---|---|
| 1 | None | 0.145 | 2.93 | 0 | 0 | 3.08 |
| 2 | NaCl | 0.349 | 2.76 | 0 | 0 | 3.11 |
| 3 | KCl | 0.052 | 2.98 | 0 | 0 | 3.03 |
| 4 | RbCl | 0.052 | 2.41 | 0.525 | 0 | 2.99 |
| 5 | CsCl | 0.046 | 2.15 | 0 | 0.545 | 2.74 |

TABLE II

Examples 1-5 - Micropore volume, surface area, and platinum dispersion.

| Example | Alkali Metal Wash Salt | Support Micropore Volume (cc/g) | Support Surface Area (m²/g) | Catalyst Micropore Volume (cc/g) | Catalyst Surface Area (m²/g) | Platinum Dispersion |
|---|---|---|---|---|---|---|
| 1 | None | 0.095 | 265 | 0.0530 | 178 | 64.5 |
| 2 | NaCl | 0.078 | 231 | 0.0485 | 167 | 61.8 |
| 3 | KCl | 0.066 | 205 | 0.0363 | 132 | 56.7 |
| 4 | RbCl | 0.063 | 195 | 0.0409 | 143 | 59.5 |
| 5 | CsCl | 0.061 | 191 | 0.0315 | 119 | 58.8 |

TABLE III

Examples 1-5 - Catalyst performance summary.

| Example | Wash Salt | Benzene Selectivity | $T_{EOR}$ (° F.) |
|---|---|---|---|
| 1 | None | 0.942 | 942 |
| 2 | NaCl | 0.938 | 946 |
| 3 | KCl | 0.955 | 943 |
| 4 | RbCl | 0.953 | 937 |
| 5 | CsCl | 0.962 | 947 |

The invention is described above with reference to numerous aspects and specific examples. Many variations will suggest themselves to those skilled in the art in light of the above detailed description. All such obvious variations are within the full intended scope of the appended claims. Other aspects of the invention may include, but are not limited to, the following (aspects are described as "comprising" but, alternatively, may "consist essentially of" or "consist of"):

Aspect 1. A method of producing a supported catalyst, the method comprising:
(a) providing a bound zeolite base;
(b) washing the bound zeolite base with an aqueous solution comprising an alkali metal to produce an alkali metal enriched zeolite support; and
(c) impregnating the alkali metal enriched zeolite support with a transition metal and a halogen to produce the supported catalyst.

Aspect 2. The method defined in aspect 1, wherein the alkali metal comprises potassium, rubidium, cesium, or combinations thereof.

Aspect 3. The method defined in aspect 1 or 2, wherein the aqueous solution comprises an alkali metal salt.

Aspect 4. The method defined in any one of the preceding aspects, wherein the aqueous solution comprises an alkali metal chloride salt.

Aspect 5. The method defined in any one of aspects 1-4, wherein the alkali metal comprises potassium.

Aspect 6. The method defined in any one of aspects 1-4, wherein the alkali metal comprises rubidium.

Aspect 7. The method defined in any one of aspects 1-4, wherein the alkali metal comprises cesium.

Aspect 8. The method defined in any of the preceding aspects, wherein the bound zeolite base comprises a zeolite and a binder.

Aspect 9. The method defined in aspect 8, wherein the bound zeolite base comprises any weight percentage of binder disclosed herein, e.g., from about 3 wt. % to about 35 wt. %, or from about 5 wt. % to about 30 wt. % binder, based on the total weight of the bound zeolite base.

Aspect 10. The method defined in aspect 8 or 9, wherein the binder comprises an inorganic solid oxide, a clay, or a combination thereof.

Aspect 11. The method defined in aspect 8 or 9, wherein the binder comprises alumina, silica, magnesia, boria, titania, zirconia, a mixed oxide thereof, or a mixture thereof.

Aspect 12. The method defined in aspect 8 or 9, wherein the binder comprises silica.

Aspect 13. The method defined in aspect 8 or 9, wherein the binder comprises montmorillonite, kaolin, cement, or a combination thereof.

Aspect 14. The method defined in any one of the preceding aspects, wherein the bound zeolite base comprises a bound L-zeolite.

Aspect 15. The method defined in any one of aspects 1-13, wherein the bound zeolite base comprises a bound Ba/L-zeolite.

Aspect 16. The method defined in any one of aspects 1-13, wherein the bound zeolite base comprises a bound K/L-zeolite.

Aspect 17. The method defined in any one of aspects 1-12, wherein the bound zeolite base comprises a silica-bound K/L-zeolite Aspect 18. The method defined in any one of the preceding aspects, wherein the bound zeolite base in step (a) is produced by a process comprising mixing a zeolite with a binder, extruding the mixture, drying, and calcining.

Aspect 19. The method defined in any one of aspects 1-12, wherein the bound zeolite base in step (a) is produced by a process comprising mixing a K/L-zeolite with silica, extruding the mixture, drying, and calcining.

Aspect 20. The method defined in any one of the preceding aspects, wherein the washing step comprises contacting the bound zeolite base with any aqueous solution disclosed herein, e.g., consisting essentially of, or consisting of, an alkali metal salt and water, or an alkali metal salt and deionized water.

Aspect 21. The method defined in any one of the preceding aspects, wherein the washing step is conducted at any washing temperature disclosed herein, e.g., in a range from about 20° C. to about 95° C., from about 15° C. to about 65° C., or from about 30° C. to about 50° C.

Aspect 22. The method defined in any one of the preceding aspects, wherein the washing step includes any number of washing cycles (e.g., from 1 to 4, or from 2 to 8) and any washing cycle time periods disclosed herein (e.g., in a range of from about 1 minute to about 6 hours, or from about 5 minutes to about 2 hours).

Aspect 23. The method defined in any one of the preceding aspects, wherein the concentration of the alkali metal in the aqueous solution is in any concentration range disclosed herein, e.g., from about 0.01 M to about 5 M, from about 0.01 M to about 1 M, from about 0.01 M to about 0.45 M, or from about 0.05 M to about 0.3 M.

Aspect 24. The method defined in any one of the preceding aspects, wherein the ratio of the weight of the aqueous solution to the weight of the bound zeolite base is in any range of weight ratios disclosed herein, e.g., from about 0.4:1 to about 10:1, from about 0.5:1 to about 8:1, or from about 1:1 to about 5:1.

Aspect 25. The method defined in any one of the preceding aspects, wherein the washing step enriches the bound zeolite base with any molar amount of alkali metal disclosed herein, e.g., from about 0.03 moles to about 1 mole, from about 0.1 moles to about 0.9 moles, or from about 0.03 moles to about 0.7 moles, of alkali metal per kg of the bound zeolite base (or per kg of the alkali metal enriched zeolite support).

Aspect 26. The method defined in any one of the preceding aspects, wherein the alkali metal enriched zeolite support comprises any weight percentage of sodium disclosed herein, e.g., from 0 wt. % to about 0.35 wt. %, from 0 wt. % to about 0.3 wt. %, from about 0.03 wt. % to about 0.35 wt. %, or from about 0.05 wt. % to about 0.3 wt. % sodium, based on the total weight of the alkali metal enriched zeolite support.

Aspect 27. The method defined in any one of the preceding aspects, wherein step (b) is the only step in the method that utilizes an alkali metal, for example, an alkali metal salt.

Aspect 28. The method defined in any one of the preceding aspects, wherein the method further comprises drying and/or calcining the alkali metal enriched zeolite support prior to step (c).

Aspect 29. The method defined in any one of the preceding aspects, wherein the supported catalyst comprises any weight percentage of transition metal disclosed herein, e.g., from about 0.1 wt. % to about 10 wt. %, from about 0.2 wt. % to about 5 wt. %, or from about 0.3 wt. % to about 2 wt. % transition metal, based on the total weight of the supported catalyst.

Aspect 30. The method defined in any one of the preceding aspects, wherein the transition metal comprises platinum.

Aspect 31. The supported catalyst defined in any one of the preceding aspects, wherein the transition metal is platinum.

Aspect 32. The method defined in any one of the preceding aspects, wherein the supported catalyst comprises any weight percentage range of platinum disclosed herein, e.g., from about 0.1 wt. % to about 10 wt. %, from about 0.2 wt. % to about 5 wt. %, or from about 0.3 wt. % to about 2 wt. % platinum, based on the total weight of the supported catalyst.

Aspect 33. The method defined in any one of the preceding aspects, wherein step (c) comprises mixing the alkali metal enriched zeolite support with a transition metal-containing compound comprising tetraamineplatinum(II) chloride, tetraamineplatinum(II) nitrate, platinum(II) acetylacetonate, platinum(II) chloride, ammonium tetrachloroplatinate(II), chloroplatinic acid, platinum (II) nitrate, or a combination thereof.

Aspect 34. The method defined in any one of the preceding aspects, wherein the halogen comprises chlorine and/or fluorine.

Aspect 35. The method defined in any one of the preceding aspects, wherein step (c) comprises mixing the alkali metal enriched zeolite support with a chlorine-containing compound and/or a fluorine-containing compound.

Aspect 36. The method defined in any one of aspects 1-35, wherein the halogen comprises chlorine.

Aspect 37. The method defined in aspect 36, wherein the supported catalyst comprises any weight percentage of chlorine disclosed herein, e.g., from about 0.05 wt. % to about 5 wt. %, from about 0.1 wt. % to about 1.5 wt. %, from about 0.2 wt. % to about 1 wt. % chlorine, based on the total weight of the supported catalyst.

Aspect 38. The method defined in any one of aspects 1-37, wherein the halogen comprises fluorine.

Aspect 39. The method defined in aspect 38, wherein the supported catalyst comprises any weight percentage of fluorine disclosed herein, e.g., from about 0.05 wt. % to about 5 wt. %, from about 0.1 wt. % to about 1.5 wt. %, from about 0.2 wt. % to about 1 wt. % fluorine, based on the total weight of the supported catalyst.

Aspect 40. The method defined in any one of the preceding aspects, wherein the method further comprises drying and/or calcining the supported catalyst after step (c).

Aspect 41. The method defined in any one of the preceding aspects, wherein the method further comprises a reducing step after step (c), the reducing step comprising contacting the supported catalyst with any reducing gas stream disclosed herein, e.g., comprising hydrogen.

Aspect 42. The method defined in aspect 41, wherein the reducing step is conducted at any reducing temperature disclosed herein, e.g., in a range from about 100° C. to about 700° C., or from about 200° C. to about 600° C.

Aspect 43. A supported catalyst obtained by the method defined in any one of the preceding aspects, e.g., a supported aromatization catalyst.

Aspect 44. The supported catalyst or method defined in any one of the preceding aspects, wherein the supported catalyst comprises any ppm amount (by weight) of the alkali metal disclosed herein, e.g., from about 10,000 ppm to about 125,000 ppm (from about 1 wt. % to about 12.5 wt. %), from about 20,000 ppm to about 100,000 ppm (from about 2 wt. % to about 10 wt. %), or from about 30,000 ppm to about 90,000 ppm (from about 3 wt. % to about 9 wt. %), based on the total weight of the supported catalyst.

Aspect 45. The supported catalyst or method defined in any one of the preceding aspects, wherein the supported catalyst has a surface area less than that of a catalyst obtained by washing the bound zeolite base with an aqueous solution that does not contain an alkali metal, under the same catalyst preparation conditions.

Aspect 46. The supported catalyst or method defined in any one of the preceding aspects, wherein the supported catalyst has a surface area in any range of surface area disclosed herein, e.g., from about 100 m$^2$/g to about 170 m$^2$/g, or from about 100 m$^2$/g to about 150 m$^2$/g.

Aspect 47. The supported catalyst or method defined in any one of the preceding aspects, wherein the alkali metal enriched zeolite support has a surface area in any range of surface area disclosed herein, e.g., from about 120 m$^2$/g to about 250 m$^2$/g, or from about 130 m$^2$/g to about 230 m$^2$/g.

Aspect 48. The supported catalyst or method defined in any one of the preceding aspects, wherein the supported catalyst has a micropore volume area less than that of a catalyst obtained by washing the bound zeolite base with an aqueous solution that does not contain an alkali metal, under the same catalyst preparation conditions.

Aspect 49. The supported catalyst or method defined in any one of the preceding aspects, wherein the supported catalyst has a micropore volume in any range of micropore volume disclosed herein, e.g., from about 0.015 cc/g to about 0.05 cc/g, or from about 0.02 cc/g to about 0.045 cc/g.

Aspect 50. The supported catalyst or method defined in any one of the preceding aspects, wherein the alkali metal enriched zeolite support has a micropore volume in any range of micropore volume disclosed herein, e.g., from about 0.025 cc/g to about 0.08 cc/g, or from about 0.03 cc/g to about 0.07 cc/g.

Aspect 51. The supported catalyst or method defined in any one of the preceding aspects, wherein the supported catalyst is characterized by a T$_{EOR}$ in any range disclosed herein, e.g., from about 499° C. (930° F.) to about 530° C. (986° F.).

Aspect 52. The supported catalyst or method defined in any one of the preceding aspects, wherein the supported catalyst is characterized by a benzene selectivity (or a toluene selectivity) in any selectivity range disclosed herein, e.g., from about 0.91 to about 0.97, from about 0.92 to about 0.98, from about 0.92 to about 0.97, or from about 0.95 to about 0.98.

Aspect 53. The supported catalyst or method defined in any one of the preceding aspects, wherein the supported catalyst has a benzene selectivity (or a toluene selectivity) greater than that of a catalyst obtained by washing the bound zeolite base with an aqueous solution that does not contain an alkali metal, under the same catalyst preparation and aromatization reaction conditions.

Aspect 54. The supported catalyst or method defined in any one of the preceding aspects, wherein the supported catalyst has a platinum dispersion in any range disclosed herein, e.g., from about 50% to about 70%, from about 50% to about 65%, or from about 55% to about 70%.

Aspect 55. A reforming process comprising contacting a hydrocarbon feed with a supported aromatization catalyst under reforming conditions in a reactor system to produce an aromatic product, wherein the supported aromatization catalyst is the supported catalyst defined in any one of the preceding aspects.

Aspect 56. The process defined in aspect 55, wherein the hydrocarbon feed is any hydrocarbon feed disclosed herein, for example, comprising non-aromatic hydrocarbons, comprising C$_6$-C$_9$ alkanes and/or cycloalkanes, or comprising C$_6$-C$_8$ alkanes and/or cycloalkanes.

We claim:
1. A method of producing a supported catalyst, the method comprising:
    (a) providing a bound zeolite base;
    (b) washing the bound zeolite base with an aqueous solution comprising potassium to produce a potassium enriched zeolite support; and
    (c) impregnating the potassium enriched zeolite support with a transition metal and a halogen to produce the supported catalyst;
    wherein the concentration of potassium in the aqueous solution is in a range from about 0.15 M to about 0.45 M; and
    wherein the supported catalyst has a surface area in a range from about 100 m$^2$/g to about 170 m$^2$/g and a micropore volume in a range from about 0.015 cc/g to about 0.05 cc/g.

2. The method of claim 1, wherein:
    the aqueous solution comprises potassium chloride; and
    the aqueous solution further comprises rubidium, cesium, or a combination thereof.

3. The method of claim 1, wherein the concentration of potassium in the aqueous solution is in a range from about 0.2 M to about 0.45 M.

4. The method of claim 1, wherein step (b) comprises from 2 to 8 washing cycles, and a ratio of the weight of the aqueous solution to the weight of the bound zeolite base in each washing cycle independently is in a range about 1:1 to about 5:1.

5. The method of claim 1, wherein:
    the transition metal comprises platinum;
    the halogen comprises fluorine and chlorine; and
    the supported catalyst comprises:
        from about 0.2 wt. % to about 5 wt. % platinum;
        from about 0.1 wt. % to about 1.5 wt. % fluorine; and
        from about 0.1 wt. % to about 1.5 wt. % chlorine;
        based on the total weight of the supported catalyst.

6. The method of claim 1, wherein the supported catalyst has a surface area in a range from about 100 m$^2$/g to about 150 m$^2$/g and a micropore volume in a range from about 0.02 cc/g to about 0.045 cc/g.

7. The method of claim 1, wherein:
    the supported catalyst is characterized by a benzene selectivity in a range from about 0.92 to about 0.98; and
    the supported catalyst has a benzene selectivity greater than that of a catalyst obtained by washing the bound zeolite base with an aqueous solution that does not contain potassium, under the same catalyst preparation and aromatization reaction conditions.

8. The method of claim 1, wherein the bound zeolite base comprises a bound L-zeolite.

9. The method of claim 1, wherein step (b) is conducted at a washing temperature in a range from about 15° C. to about 65° C.

10. The method of claim 1, wherein the concentration of potassium in the aqueous solution is in a range from about 0.15 M to about 0.35 M.

11. The method of claim 1, wherein the method further comprises drying and/or calcining the potassium enriched zeolite support prior to step (c).

12. The method of claim 1, wherein step (c) comprises mixing the potassium enriched zeolite support with a transition metal-containing compound comprising tetraamineplatinum(II) chloride, tetraamineplatinum(II) nitrate, platinum(II) acetyl acetonate, platinum(II) chloride, ammonium tetrachloroplatinate(II), chloroplatinic acid, platinum (II) nitrate, or a combination thereof.

13. The method of claim 1, wherein step (c) comprises mixing the potassium enriched zeolite support with a chlorine-containing compound and/or a fluorine-containing compound.

14. The method of claim 1, wherein the method further comprises drying and/or calcining the supported catalyst after step (c).

15. The method of claim 1, wherein the supported catalyst comprises from about 1 wt. % to about 12.5 wt. % potassium, based on the total weight of the supported catalyst.

16. The method of claim 1, wherein step (b) enriches the bound zeolite base with from about 0.03 moles to about 1 mole of potassium per kg of the potassium enriched zeolite support.

17. The method of claim 1, wherein the potassium enriched zeolite support comprises from about 0.03 wt. % to about 0.2 wt. % sodium, based on the total weight of the potassium enriched zeolite support.

18. The method of claim 1, wherein:
the surface area of the supported catalyst is in a range from about 105 $m^2$/g to about 160 $m^2$/g; and
the micropore volume of the supported catalyst is in a range from about 0.02 cc/g to about 0.045 cc/g.

19. The method of claim 1, wherein the transition metal comprises platinum, and the supported catalyst has a platinum dispersion in a range from about 50% to about 65%.

20. A method of producing a supported catalyst, the method comprising:
(a) providing a bound zeolite base;
(b) washing the bound zeolite base with an aqueous solution comprising potassium to produce a potassium enriched zeolite support; and
(c) impregnating the potassium enriched zeolite support with platinum, fluorine, and chlorine to produce the supported catalyst;
wherein the aqueous solution comprises potassium chloride;
wherein the concentration of potassium in the aqueous solution is in a range from about 0.15 M to about 0.45 M; and
wherein the supported catalyst has a surface area in a range from about 100 $m^2$/g to about 170 $m^2$/g and a micropore volume in a range from about 0.015 cc/g to about 0.05 cc/g.

21. The method of claim 20, wherein:
the bound zeolite base comprises a bound L-zeolite;
the supported catalyst comprises, based on the total weight of the supported catalyst,
from about 0.2 wt. % to about 5 wt. % platinum,
from about 0.1 wt. % to about 1.5 wt. % fluorine, and
from about 0.1 wt. % to about 1.5 wt. % chlorine; and
the concentration of potassium in the aqueous solution is in a range from about 0.2 M to about 0.35 M.

\* \* \* \* \*